United States Patent [19]
Lawrence et al.

[11] Patent Number: 5,628,901
[45] Date of Patent: May 13, 1997

[54] VESSEL FOR TREATING LIQUIDS

[75] Inventors: William L. Lawrence; Robert D. Coyle, both of Louisville, Ky.

[73] Assignee: Castrol Industrial North America Inc., Downers Grove, Ill.

[21] Appl. No.: 55,851

[22] Filed: Apr. 30, 1993

[51] Int. Cl.$^6$ .............................. B01D 1/22; B01D 3/28; B01D 36/00; B01D 39/20

[52] U.S. Cl. .................. 210/251; 210/184; 210/186; 210/188; 210/239; 210/240; 210/489; 210/510.1; 210/DIG. 5; 202/205; 202/236; 202/267.1; 159/5; 159/6.1; 159/13.1; 159/DIG. 27; 196/46.1; 196/114; 196/128; 203/72; 203/91; 203/14; 203/39

[58] Field of Search ................ 210/510.1, 450, 210/228, 227, 231, 335, 456, DIG. 5, 184, 186, 488, 188, 708, 799, 489, 239, 240, 251; 202/205, 236, 267.1; 159/5, 6.1, 13.1, DIG. 27, DIG. 28; 196/46.1, 114, 128; 203/72, 91, 89, 39, 86, 14

[56] References Cited

U.S. PATENT DOCUMENTS

| | | |
|---|---|---|
| 468,647 | 2/1892 | Fehr . |
| 2,404,872 | 7/1946 | Walker, Jr. . |
| 2,448,930 | 9/1948 | Stokes . |
| 2,513,556 | 7/1950 | Furczyk . |
| 2,562,730 | 7/1951 | Miller . |
| 2,745,513 | 5/1956 | Massey . |
| 2,855,345 | 10/1958 | Mares . |
| 2,857,979 | 10/1958 | Van Dijck . |
| 2,937,977 | 5/1960 | Topol . |
| 2,947,419 | 8/1960 | Kasten . |
| 3,176,446 | 4/1965 | Siggelin . |
| 3,214,368 | 10/1965 | Muller . |
| 3,221,807 | 12/1965 | Johansson . |
| 3,352,778 | 11/1967 | Brink, Jr. et al. . |
| 3,410,057 | 11/1968 | Lerner . |
| 3,414,384 | 12/1968 | Goerg . |
| 3,486,984 | 12/1969 | Sperry . |
| 3,502,596 | 3/1970 | Sowards . |
| 3,580,817 | 5/1971 | Schnur . |
| 3,625,362 | 12/1971 | Sicard . |
| 3,947,363 | 3/1976 | Pryor et al. . |
| 4,196,027 | 4/1980 | Walker et al. . |
| 4,251,239 | 2/1981 | Clyde et al. . |
| 4,283,210 | 8/1981 | Mochida et al. . |
| 4,342,574 | 8/1982 | Fetzer . |
| 4,364,760 | 12/1982 | Higuchi et al. . |
| 4,402,361 | 9/1983 | Dominguez . |
| 4,560,478 | 12/1985 | Narumiya . |
| 4,587,016 | 5/1986 | Sumiyoshi . |
| 4,612,086 | 9/1986 | Dominguez . |
| 4,629,483 | 12/1986 | Stanton . |
| 4,769,147 | 9/1988 | Lawrence et al. . |
| 4,874,516 | 10/1989 | Kondo . |
| 4,888,117 | 12/1989 | Brown et al. . |
| 4,957,625 | 9/1990 | Katoh . |
| 5,011,603 | 4/1991 | Katoh . |
| 5,039,340 | 8/1991 | Hargus . |
| 5,100,551 | 3/1992 | Pall . |
| 5,194,154 | 3/1993 | Moyer . |
| 5,252,206 | 10/1993 | Gonzalez . |
| 5,269,926 | 12/1993 | Webster . |
| 5,273,650 | 12/1993 | Vermes . |

FOREIGN PATENT DOCUMENTS

| | | |
|---|---|---|
| 1489522 | 7/1967 | France . |
| 1579254 | 8/1969 | France . |
| 261641 | 6/1911 | Germany . |
| 281743 | 2/1950 | Switzerland . |
| 787870 | 12/1957 | United Kingdom . |
| 1433501 | 4/1976 | United Kingdom . |

OTHER PUBLICATIONS (2) sheets of Opcon Drawings.

*Primary Examiner*—Thomas M. Lithgow
*Attorney, Agent, or Firm*—Wheat Camoriano Smith & Beres PLC

[57] ABSTRACT

A single vessel with no moving parts is constructed to perform the functions of coalescing, vacuum dehydration, and thin film evaporation.

8 Claims, 5 Drawing Sheets

VESSEL FOR TREATING LIQUIDS

BACKGROUND OF THE INVENTION

The present invention relates to the treatment of liquids, and, in particular, to a device for coalescing a liquid out of a liquid-liquid suspension, for vacuum dehydration, and for thin-film evaporation.

Several different processes have been used for recycling oils to remove water and other contaminants from the oil. Among the processes are thin film and wiped film vacuum distillation, vacuum dehydration, filtration, clay treating, centrifuging, coalescing, and decanting.

The first step in the recycling of any industrial lubricant is to remove the free water. This can be accomplished by heating the oil up and allowing the free water to settle. However, it takes a substantial amount of time for settling to occur and requires substantial storage capacity. In the case of portable recycling units, for which the present invention is intended, the time limitation is important and there is very limited storage, so settling tanks are not an option for portable units.

Many recycling businesses use centrifuges to spin out the free water. These are somewhat effective, but they cannot remove all the solids and free water, they require a great deal of maintenance, and their efficiency can be greatly reduced by changes in feed conditions.

Many recycling businesses use cartridge coalescers to remove free water from the oil, but these are not very efficient, require storage for settling, and require several passes through the cartridge to remove any substantial amount of water, thereby making the process slow.

Once most of the free water has been removed, the rest of the water must be removed. This can be done in several ways. First, the oil can be heated to 250 degrees F. to drive off all the water. This is a slow, energy intensive method, which also tends to oxidize the oil and destroy additives in the oil. It is possible to remove the water chemically, but this also tends to destroy the additives and oxidize the base oil.

Another method for removing the water is vacuum dehydration. The known devices for using this technique use diffuser cartridges in a vacuum chamber. The diffuser cartridges have a very limited surface area, tend to plug frequently, and have very low production rates if the oil has more than one percent water, which is usually the case in recycling. Another problem with vacuum dehydration is the generation of what is known as "rag". This is considered an unrecoverable material (which looks like a shredded rag) that is created when oil and water are mixed together in certain circumstances.

Another method for purifying the oil is through thin-film distillation or evaporation. Most thin-film evaporators have movable parts (such as scrapers) to keep the thin film in contact with the surface of the heat exchanger. These movable parts must be manufactured with very close tolerances and are expensive and require maintenance. Other types of evaporators tend to plug and to foam.

SUMMARY OF THE INVENTION

The present invention provides a device which overcomes many of the problems of the prior art devices.

The present invention provides a device which performs the coalescing function much more efficiently than prior art coalescers for removing free water from oil.

The present invention provides a device which performs the vacuum dehydration function more efficiently than prior art vacuum dehydrators.

The present invention provides a device which achieves substantially the same results as a scraped surface heat exchanger without any moving parts.

The present invention provides a device which performs coalescing, vacuum dehydration, and thin-film evaporation in a single vessel, thereby saving substantial capital equipment costs.

The present invention performs the functions of coalescing, vacuum dehydration, and thin-film evaporation in a single vessel with no moving parts, thereby saving substantial maintenance costs.

The present invention eliminates the problem of formation of rag by providing good shear during vacuum dehydration.

DESCRIPTION OF THE PREFERRED EMBODIMENT

The device shown in the figures described above can be used for several different functions. It can be used for coalescing, to remove the free water from an oil or to separate any two immiscible liquids of different densities. It can also be used for vacuum dehydration. It can also be used for thin film evaporation.

Figure 1:
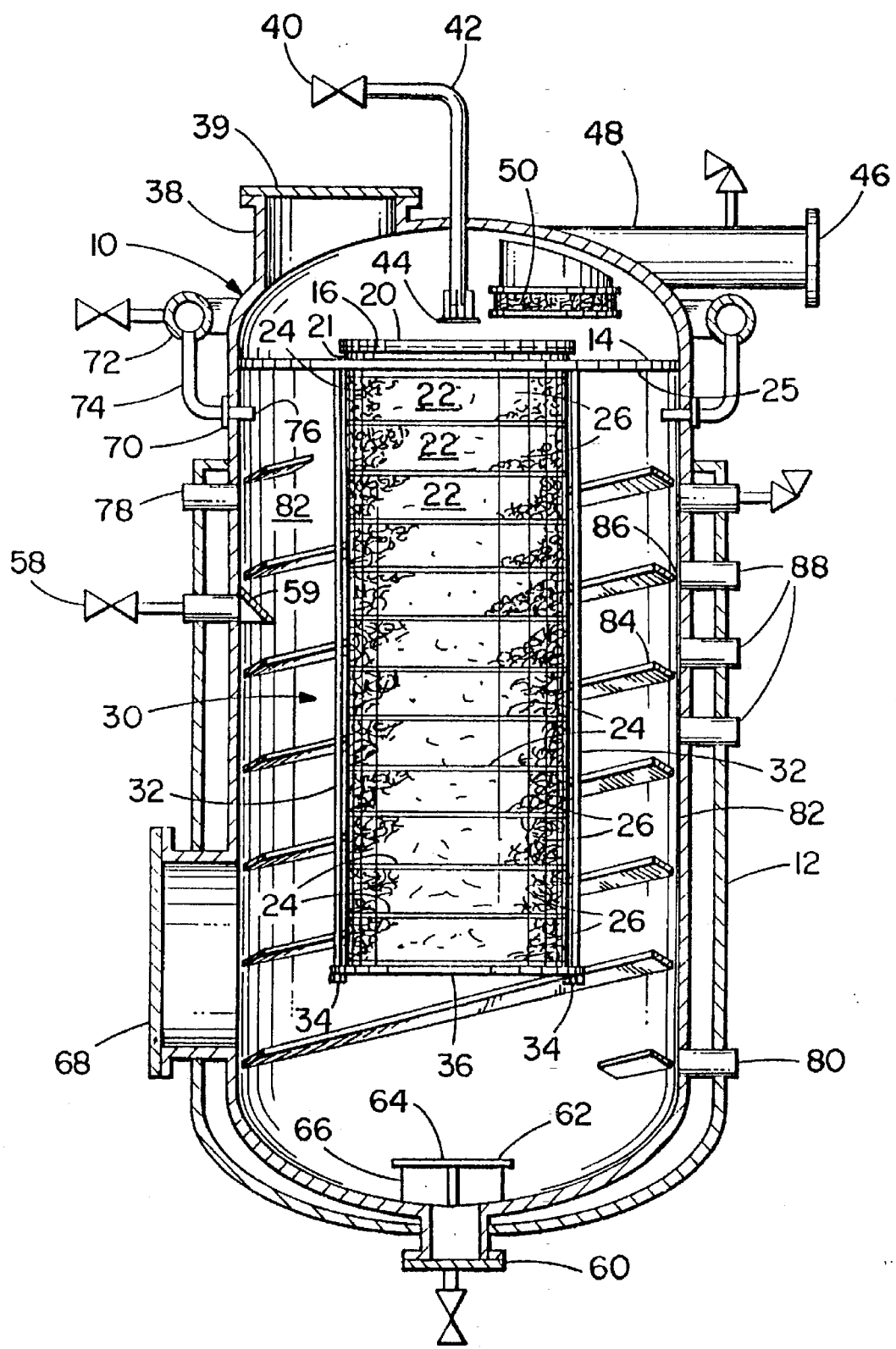
FIG. 1 is a schematic front view, partially in section, of the device of the present invention.

Referring to all the figures and primarily to FIG. 1, the preferred embodiment of the present invention includes an enclosed vessel 10, which is partially surrounded by a jacket 12, that serves to maintain the temperature within the vessel 10. The vessel 10 is preferably substantially cylindrical in shape, with the axis of the cylinder being vertical.

Figure 2:
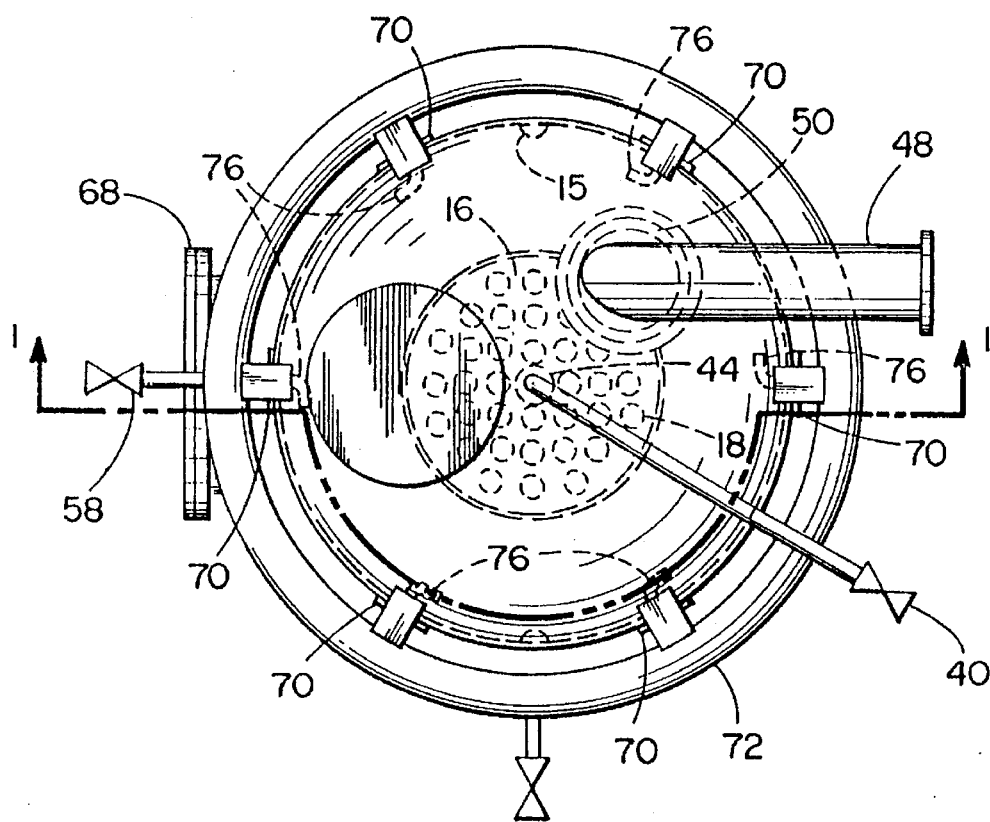
FIG. 2 is a top sectional view of the device of FIG. 1.
Figure 13:
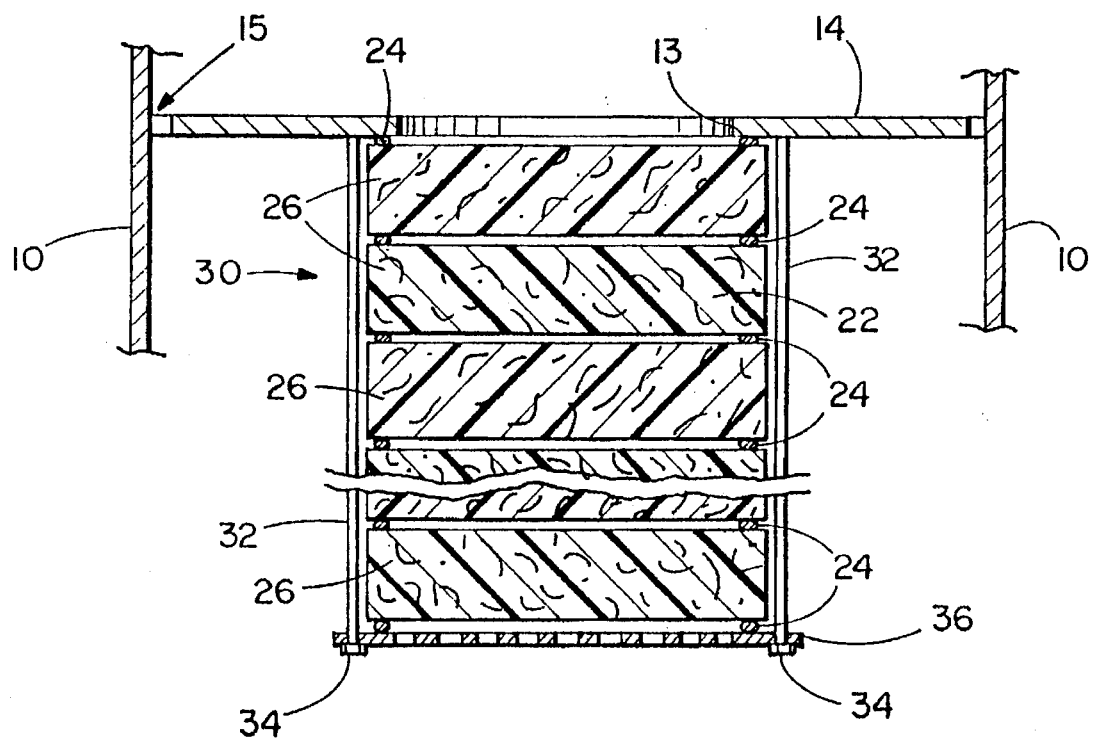
FIG. 13 is a front sectional view of a portion of the device of FIG. 1, showing the porous medium and how it is mounted on the vessel.

A circular flat plate or bulkhead 14 is welded horizontally across the vessel 10 near the top of the vessel 10. The flat plate 14 has a central opening 13 with a diameter which is preferably 3.25 inches less than the diameter of the porous medium, which will be described later. (See FIG. 13.) The flat plate 14 also has four small openings 15 near its outer periphery, as shown in FIG. 2, the function of which will be described in the section discussing vacuum dehydration. Except for the openings 13 and 15, the flat plate 14 is solid.

Figure 14:
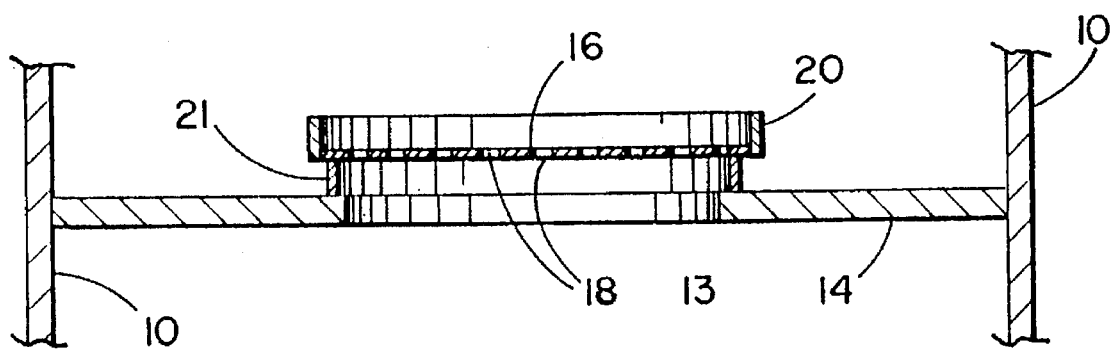
FIG. 14 is a front sectional view of a portion of the device of FIG. 1, showing the distribution tray above the porous medium.

Directly above the central opening 13 of the flat plate 14 is mounted a distributor tray 16, shown best in FIGS. 2 and 14, which has a plurality of holes 18 (preferably half-inch diameter holes on three-inch centers) and which is surrounded around its perimeter by a retaining wall or retaining ring 20 (preferably having a two-inch height). A spacer ring 21 separates the distributor tray 16 from the central opening 13 by approximately 1¾ inches. The distributor tray 16 and the spacer ring 21, which is welded around the circumference of the distributor tray, have a diameter which is approximately two inches larger than the diameter of the central opening, so the spacer ring 21 is supported directly on the flat plate or bulkhead 14 and centered over the central opening 13. The spacer ring 21 is bolted to the flat plate 14 around its circumference, and the retaining wall is welded to the distribution tray 16 about its circumference, so that the liquid that falls onto the distribution tray 16 passes down through the central opening 13.

Directly below the central opening 13 of the flat plate 14 is a stationary porous medium 22 preferably made up of a plurality of rigid ceramic sponge disks 26 stacked up to form a cylindrical shape. These disks 26 are shown in greater detail in FIG. 13. There is a gasket 24 between the uppermost ceramic sponge disk 26 and the bottom surface of the flat plate 14 to seal between the uppermost disk 26 and the flat plate 14. This gasket 24 has a diameter which is greater than the diameter of the central opening 13 and less than the outside diameter of the disk 26. The gasket 24 is preferably made of rubber or teflon.

Also, a gasket 24 is sandwiched between each adjacent pair of disks 26 to seal the gap between the disks 26 and to provide space between the disks 26. The gaskets 24 are approximately 0.37 inches high. The gaskets 24 also provide a cushion between the disks 26, so that the disks do not disintegrate in transit. Each of the ceramic sponge disks 26 has a height of approximately two inches.

The ceramic sponge disks 26 are made substantially as taught in U.S. Pat. No. 3,947,363 "Pryor", which is hereby incorporated by reference. A sponge is impregnated with a ceramic slurry, is compressed to drive the slurry out of the openings of the sponge, and is then dried. The dried, ceramic-coated sponge is then heated to burn out the sponge material and sinter the ceramic coating, leaving a rigid ceramic sponge. The disks 26 can be made with a range of pore sizes, from about 10 pores per inch to 100 pores per inch, depending upon the pore size of the sponge from which they are made. The pore size that is used in the device depends upon the viscosity of the fluid and the percentage of water that is present. In the examples described herein, a pore size of twenty pores per inch is used. In most applications, the pore size will be in the range of 10–50 pores per inch.

In some situations, it may be desirable to add a redistribution mat (not shown) between each pair of ceramic disks. The redistribution mat is a thin perforated rubber or teflon mat or screen that helps redistribute fluid from one ceramic disk to the other.

The many-layered ceramic disk-gasket sandwich 30 is rigidly mounted inside the vessel 10 by means of four rods 32 which are welded at their top ends to the flat plate 14 at a diameter which is preferably 1.5 inches larger than the diameter of the disks 26. The bottom end of each rod 32 is threaded. A gasket 24 and a perforated plate 36 (preferably having ¾ inch holes on a one inch triangular pitch) lies below the lowermost disk 26. The perforated plate 36 has additional holes which receive the threaded ends of the rods 32. Nuts 34 are fastened to the threaded ends of the rods 32 below the plate 36 to keep the porous sandwich 30 in compression so as to rigidly mount the sandwich 30 to the vessel 10.

The porous sandwich 30 is rigidly suspended in the center of the vessel 10, with the axis of the cylindrical sandwich 30 coaxial with the axis of the cylindrical vessel 10. There is a large distance (approximately the radius of the disks 26) between the sides of the porous sandwich 30 and the sides of the vessel 10. There is an even larger space between the bottom of the sandwich 30 and the bottom of the vessel 10. These large spaces provide storage room for fluid and permit fluid to move freely around the outside of the ceramic disks to take full advantage of all the surface area on the disks.

Figure 3:
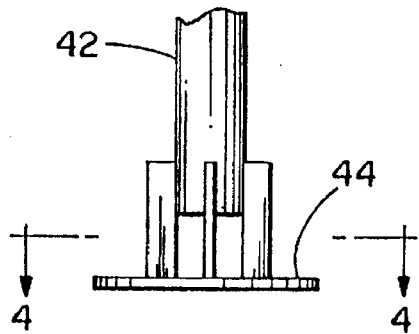
FIG. 3 is a front view of the inlet pipe leading from the top opening of FIG. 1.
Figure 4:
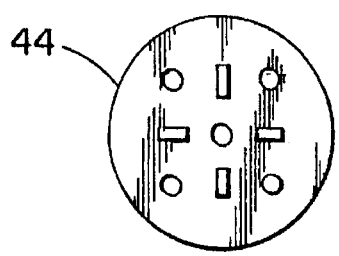
FIG. 4 is a top view of the inlet distribution baffle taken through the section 4—4 of FIG. 3.
Figure 5:
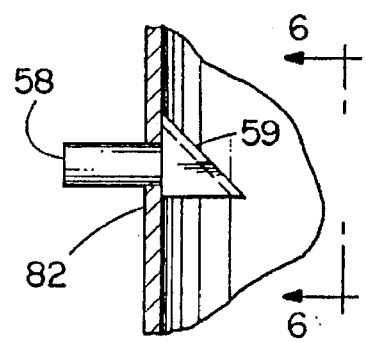
FIG. 5 is a side sectional view showing the inlet nozzle that is part-way up the vessel of FIG. 1.
Figure 6:
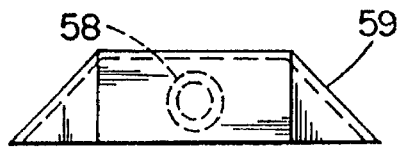
FIG. 6 is a top view of the inlet baffle mounted adjacent to the nozzle of FIG. 5.

There are several inlet and outlet openings in the vessel 10, which permit fluid to go into or out of the vessel at various points. There are two openings at the top of the vessel 10. The top inlet opening 40 communicates with an inlet pipe 42, which terminates in a distribution baffle 44 as shown in FIGS. 3 and 4. The distribution baffle 44 is centered over the distributor tray 16.

Figure 12:
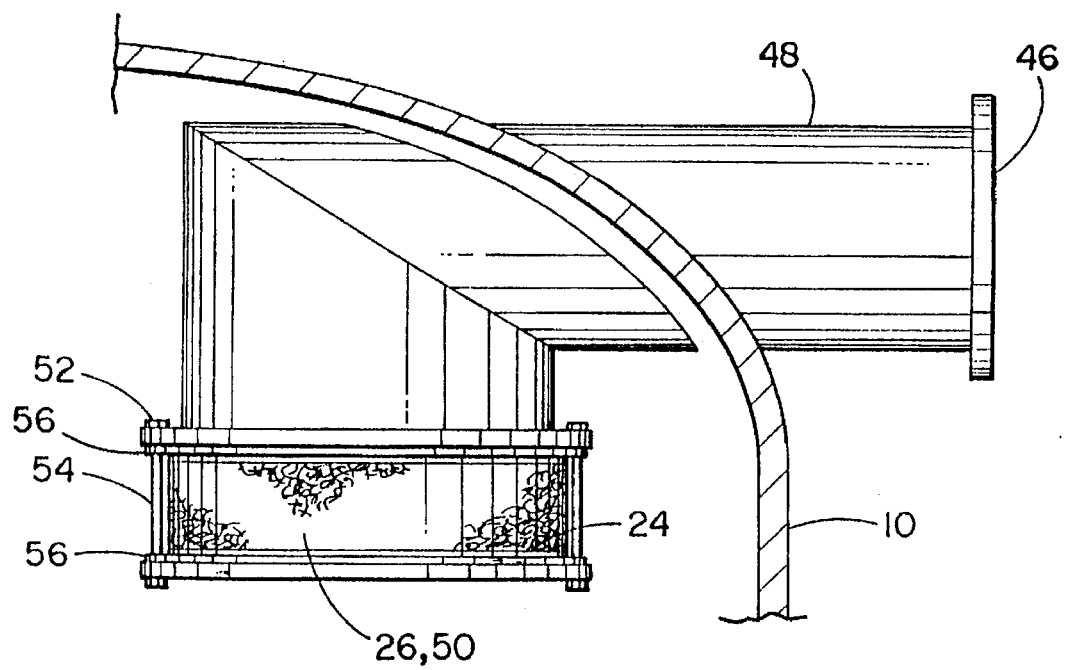
FIG. 12 is a front sectional view of a portion of the top of the device of FIG. 1, showing the demister and outlet pipe.

The top opening 46 generally serves as an outlet and communicates with an outlet pipe 48. In order for fluid to leave through the top outlet opening 46, it must pass through the demister 50, which is a single, four-inch thick ceramic sponge disk mounted to the vessel 10 by nuts 52 and bolts 54 and cushioned by rubber or teflon washers 56 as shown in FIG. 12.

There is also a top flanged opening 38 which is kept closed by a cover 39 when the device is in operation and can be opened for cleaning or other maintenance of the vessel 10.

Part-way up the vessel 10 is a liquid inlet 58 (sometimes referred to herein as the part-way up opening). This opening 58 is preferably at least half-way up the vessel 10 and is used to introduce suspensions of immiscible liquids to be separated, as will be described later. A flow shield 59 is welded to the inner surface of the vessel 10 surrounding the top and sides of the nozzle 58 so as to direct incoming fluid downwardly.

Figure 7:
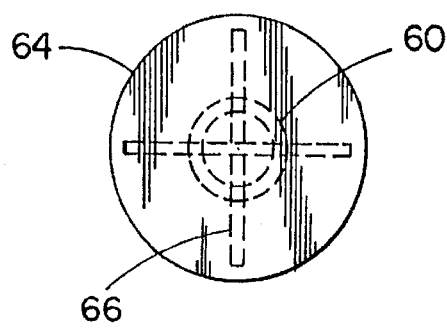
FIG. 7 is a top view of the bottom baffle mounted over the bottom opening of FIG. 1.
Figure 8:
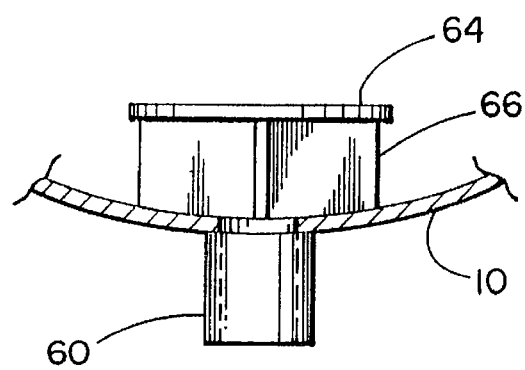
FIG. 8 is a front sectional view of the bottom baffle and bottom opening of FIG. 1.

At the bottom of the vessel 10 is a bottom opening 60, which is partially covered by a bottom baffle 62. The details of the bottom baffle 62 are shown in FIGS. 7 and 8. The bottom baffle is preferably a circular plate 64 welded on top of an X-shaped weir 66, which is centered over the bottom opening 60 and is welded to the bottom of the vessel 10. The diameter of the circular plate 64 is preferably three times the diameter of the bottom opening 60, and the X-shaped weir extends to the edge of the plate 64. The purpose of the bottom baffle 62 is to prevent a vortex from forming as fluid leaves the vessel 10 through the bottom opening 60. It also serves to keep dirt from getting into the opening 60.

There is also a covered manhole 68 near the bottom of the vessel 10, which can be opened for cleaning and other maintenance when the vessel is not in operation.

Figure 9:
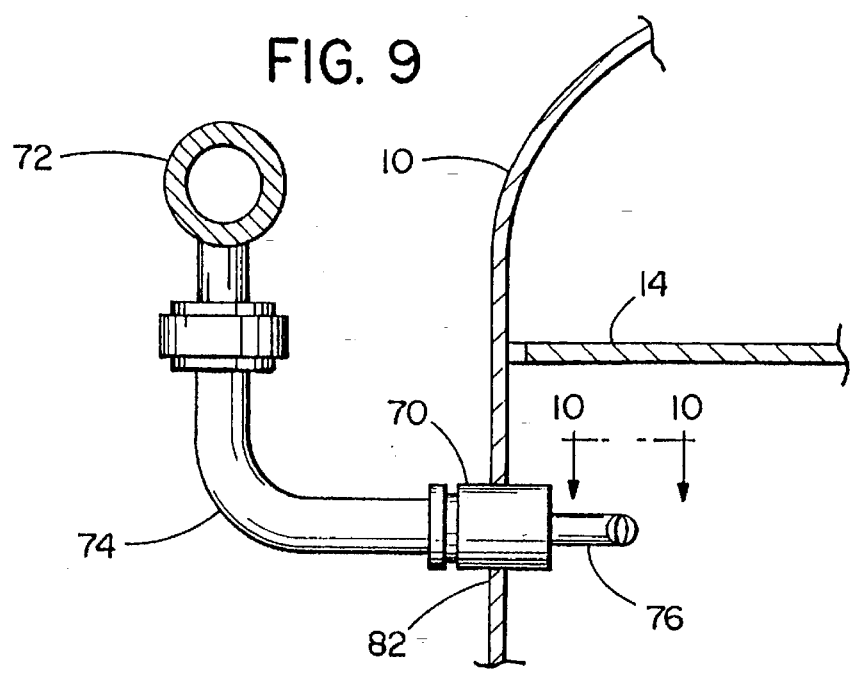
FIG. 9 is a schematic sectional view showing a portion of the injector system of FIG. 1.
Figure 11:
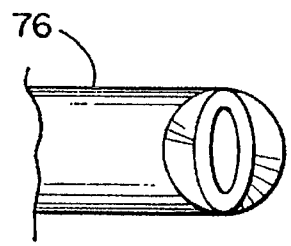
FIG. 11 is an enlarged view of the end of the nozzle of FIG. 9.
Figure 10:
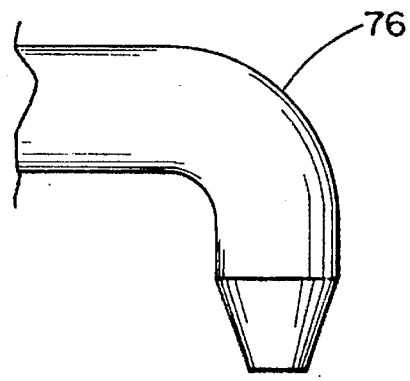
FIG. 10 is a view of the injector nozzle taken along the section 10—10 of FIG. 9.

There are also six injectors 70 for introducing fluid into the vessel 10 below the flat plate 14, near the top of the ceramic disk sandwich 30. The number of injectors 70 may vary, but six injectors have been shown to function well. The injectors 70 are shown in more detail in FIGS. 9–11. A circular pipe 72 encircles the vessel 10 near the top of the vessel 10 and serves as a header for feeding the injectors 70. A plurality of hoses 74 communicate with the header 72 and with openings in the vessel 10 (above the jacket 12). On the inside of the vessel 10, an injector jet nozzle 76 communicates with each injector hose 74. The nozzles 76 are directed horizontally and tangentially to the side of the vessel 10 so as to create a thin film when fluid is sprayed out the nozzles 76. As can be seen in FIG. 11, the end of each nozzle 76 is oval-shaped to provide a fanned-out, flat stream along the vertical wall of the vessel 10. These nozzles 76 are used for thin-film evaporation, which will be described later.

There are also openings 78, 80 in the jacket 12 for feeding the heat transfer liquid (preferably hot oil) into and out of the space between the jacket 12 and the vessel 10 to keep the vessel 10 at the proper temperature.

Figure 15:
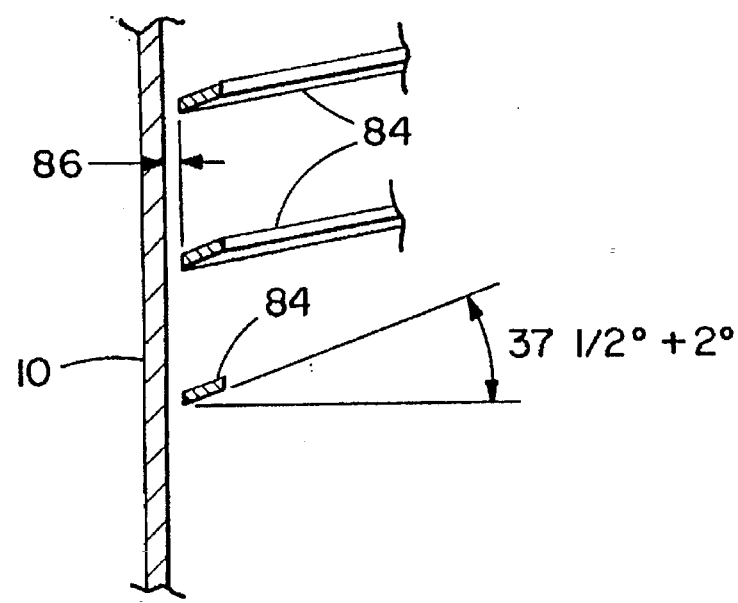
FIG. 15 is a sectional view through the vessel wall of the vessel of FIG. 1, showing the spiral baffle along the vessel wall.

Along the inner surface of the vertical wall 82 of the vessel 10 are spiral baffles 84, shown in detail in FIG. 15. The spiral baffles 84 begin just below the injectors 70 and extend down to the bottom of the vertical portion of the vessel 10. The spiral baffles 84 are preferably made of 1×⅛ inch bar which is spot-welded to the wall 82 of the vessel 10 so as to create a small gap 86 of approximately 0.125 inches between the baffles 84 and the wall. The baffles 84 are at an angle alpha from the horizontal, with the angle alpha preferably being at least 37 degrees. When the vessel 10 is being used for thin-film evaporation, the spiral baffles 84 serve to keep the liquid in a thin film along the vertical wall of the vessel 10 by permitting the liquid to flow only through the 0.125-inch gap and by redirecting fluid back horizontally along the wall when the fluid attempts to flow in toward the center of the vessel. The preferred distance between levels of the spiral is approximately one foot.

There are sight glasses 88 at various heights along the vessel 10 to permit an operator to see what is happening inside the vessel.

Operation of the device of the present invention is as follows:

For coalescing, the liquid-liquid suspension enters the vessel 10 through the part-way up opening 58, is directed downwardly by the flow shield 59, and begins to fill the vessel 10 from the bottom up.

As the liquid-liquid mixture begins entering the porous medium 22, the lighter (less dense) fluid coats the ceramic material, and the droplets of the heavier (more dense) fluid begin to coalesce. For this operation, the porous medium preferably has approximately 20 pores per inch. As the heavier droplets coalesce, they fall to the bottom of the vessel 10, creating a heavy liquid layer on the bottom of the vessel 10. As the mixture moves up the porous column toward the top of the vessel 10, more heavy liquid droplets coalesce and fall out of the mixture, and the separation improves until, as the light fluid flows out through the top outlet 46, it has lost all the free heavy fluid, and only a small amount of heavy fluid remains in the light fluid. The remaining heavy fluid will be removed through another method. (It would be possible for the light fluid to leave the vessel 10 through the top opening 40, but the top opening 46 is the preferred means of exit.)

For liquid-liquid separation of this type, the valve in the top inlet 40 preferably remains closed, and the valve for the injector header 72 remains closed. The valve at the bottom opening 60 is closed until the heavy fluid layer at the bottom of the vessel 10 is deep enough to begin pumping out the heavy fluid. The sight glasses 88 may be used to monitor the fluid levels to be sure that only the separated-out heavy fluid is being pumped out the bottom.

EXAMPLE 1:

As an example, the fluid entering the vessel 10 may be ten gallons per minute of ISO 68AW Hydraulic fluid with ten percent water. This fluid is preheated to 140 degrees F. The hot oil in the jacket 12 keeps the vessel 10 at the 140 degree temperature. The pressure at the outlet 46 is from atmospheric pressure to 5 psig. The water leaving the bottom opening 60 has 0.1% oil. The oil leaving the top opening has 3% water remaining in it.

This single pass through the device of the present invention is much more efficient than a typical single pass through a cartridge, in which 7% water would remain in the oil and several passes and additional time spent in a settling tank would be necessary to achieve the same separation as in the present invention.

It is believed that the greater efficiency of the present device is due to the effectiveness of the rigid ceramic foam as compared with other porous media and due to the large surface area (the entire perimeter and bottom surface of the ceramic sandwich 30) being effectively used.

For vacuum dehydration, the heated liquid to be separated enters the vessel 10 through the top inlet 40, through the inlet pipe 42, and passes over the distribution baffle or nozzle 44 onto the distribution tray 16. The retaining wall 20 prevents the liquid from spilling over onto the plate 14, so all the liquid passes down through the central opening 13 and falls onto the top ceramic disk 26. The liquid then passes down through the ceramic disks 26, passing through the pores in the disks 26. The vacuum in the vessel 10 causes the water in the liquid to vaporize. As the liquid goes down through the disks, the entrained water vapor is released and passes up through the disks 26, through the central opening 13, through the holes 18 in the plate 14, through the demister 50, and out the top outlet 46.

The demister 50 knocks any remaining liquid clinging to the water vapor back down onto the plate 14, and that liquid passes through the openings 15 in the plate and falls down into the bottom of the vessel 10.

In this operation, the valve for the injector header 72 is closed, and the valve for the part-way up opening 58 is closed. The oil leaves the bottom of the vessel 10 through the bottom opening 60. While this description contemplates the dehydration of a fluid, this process and this equipment could be used to separate any two fluids with substantially different boiling points.

EXAMPLE 2:

The feed for this vacuum dehydration process may be the liquid that was the product from Example 1. This liquid is ISO 68AW Hydraulic fluid with 3% water and flow rate of ten gallons per minute. Before entering the vessel 10 for the dehydration process, this liquid has been preheated to 160 degrees F. The ceramic disks have a pore size of twenty pores per inch. The operating pressure is a vacuum of 24 inches of mercury, or approximately 3 psia. The hot oil in the jacket 12 maintains the temperature in the vessel 10 at 160 degrees F.

With a single pass through this device, the oil leaving the bottom of the vessel 10 has less than 200 parts per million of water, and the water leaving the top of the vessel 10 has less than 0.1% oil.

By comparison, a typical diffuser cartridge with this feed would still have 2.5% water remaining in the oil after one pass.

When used for thin-film evaporation, the top inlet 40 and side inlet 58 are closed. The liquid feed enters through the header 72 and the hoses 74, through the nozzles 76, and is injected as a plurality of flat streams running horizontally along the inner surface 82 of the vertical wall of the vessel 10. As the fluid is in contact with the wall 82, it is heated, the more volatile part of the fluid vaporizes and passes up through the porous sandwich 30, through the central opening 13 and the holes 18, through the demister 50, and out the top outlet opening 46. Any entrained liquid is knocked out of the vapor as it passes through the pores of the sandwich 30 and the pores of the demister 50.

The ceramic sandwich 30 takes care of any foaming problem by separating out the vapor and liquid components of the foam, so the vapor passes up through the pores and the liquid drops down.

As the fluid runs along the wall 82 of the vessel 10, it is maintained as a thin film and is given the proper residence time by the helical baffle 84. The helical baffle 84 provides only a small gap through which fluid can flow, thereby maintaining a thin film. Any fluid that tries to move toward the interior of the vessel 10 is redirected by the baffle 84 to a more horizontal path and back toward the wall 82.

The results from this arrangement have been shown to be comparable to the results from a wiped surface heat exchanger but without the need for moving parts at close tolerances.

EXAMPLE 3:

The feed for this example is five gallons per minute of Mineral Seal Oil (40 SUS) with 3% hydraulic oil contamination and aluminum fines. The porous ceramic material has a pore size of 20 pores per inch. The oil is preheated to 240 degrees F. and is injected through the six injectors at 0.833 gallons per minute per injector. The operating pressure is 2 TORR, and the pressure drop across the porous sandwich 30 is less than 1 TORR.

The mineral seal oil product in the overhead is 99.8% mineral seal oil. The hot oil jacket operates at a temperature of 380 degrees F.

Since the device of the present invention can be used for several different purposes, it makes the mobile unit on which it travels very flexible and usable for many types of recyclable products that may be encountered without the need to carry many different pieces of equipment. It may be that two of these units will be connected in series, with the first unit usually being used for coalescing and the second unit being used for vacuum dehydration. It may be that only a single unit is used, and a holding tank on the mobile unit or on site is used to store the product from the vessel before feeding it back into the vessel 10 for a second type of process to be conducted.

This equipment provides a flexibility that is unavailable in previous equipment. It also can produce product more quickly, because it does not require the many passes and the settling time that are required by prior art equipment. This equipment is also very compact for travel, with the vessel inside diameter in the example shown here on the order of 42 inches and the height of the vessel 10 about 72 inches. In the three examples shown above, the outside diameter of the ceramic disks is 16 inches, and ten disks were used.

It will be obvious to those skilled in the art that many modifications may be made to the preferred embodiment described above without departing from the scope of the present invention.

What is claimed is:

1. A device for separating a liquid into its parts, comprising:
    an enclosed, hollow vessel including a wall;
    a stationary, porous medium suspended in the vessel;
    a port part-way up the vessel;
    a spiral baffle along the wall of said vessel with a small gap between said spiral baffle and the wall to keep fluid in a thin film along the wall;
    a top opening near the top of the vessel, said top opening being in fluid communication with said porous medium, such that any liquid entering the vessel through the part-way up port must pass through said porous medium in order to leave the vessel through said top opening;
    a bottom opening near the bottom of the vessel; and
    an injection system for injecting fluid near the top of said vessel at point along the wall of said vessel in a substantially horizontal direction tangent to the wall of said vessel;
    said device alternately functioning as a continuous coalescer, such that a liquid-liquid mixture entering through the part-way up port will be separated by the porous medium, with the light liquid leaving through the top opening and the heavy liquid leaving through the bottom opening; and as a continuous evaporator.

2. A device as recited in claim 1, wherein said stationary porous medium is centrally located in said vessel, with space between said porous medium and the sides and bottom of said vessel.

3. A device for separating a liquid into its parts as recited in claim 1, wherein said stationary, porous medium comprises:
    a plurality of porous ceramic sponge wafer units, each unit having flat top and bottom surfaces;
    a plurality of cushioning gaskets; each of said cushioning gaskets sandwiched between two of said porous ceramic units; and
    a rigid compression means for maintaining said porous ceramic units and cushioning gaskets in sandwiched alignment and for rigidly connecting said porous ceramic units and gaskets to said vessel.

4. A device for separating a liquid into its parts, comprising:
    an enclosed, hollow vessel;
    a stationary, porous medium in said vessel;
    a port part-way up the vessel;
    a bottom opening near the bottom of the vessel;
    a top opening near the top of the vessel, said top opening being in fluid communication with said stationary porous medium, such that any liquid entering the vessel through the part-way up port must pass through said porous medium in order to leave the vessel through said top opening; and
    a jacket around said vessel for receiving fluid to control the temperature inside said vessel;
    said device functioning as a continuous coalescer, wherein a liquid-liquid mixture entering through the part-way up port is separated by the porous medium, with the light liquid leaving through the top opening and the heavy liquid leaving through the bottom opening, and further comprising:

an inlet pipe near the top of said vessel; and a distribution means between said inlet pipe and said porous medium, such that, if liquid enters said vessel through said inlet pipe, it is distributed over the top of said porous medium by said distribution means.

5. A device as recited in claim 4, wherein said distribution means comprises:

a pipe from said top opening into said vessel; and a spray nozzle at the end of said pipe opposite said top opening.

6. A device as recited in claim 5, wherein said distribution means further comprises:

a horizontal plate defining a plurality of spaced holes and lying above said porous medium; and a wall around the periphery of said horizontal plate, such that liquid that is sprayed onto the horizontal plate by the spray nozzle is retained on the plate by the wall and leaves the plate through the holes, falling onto the porous medium.

7. A device for separating a liquid into its parts as recited in claim 4, wherein said stationary, porous medium comprises:

a plurality of porous ceramic sponge wafer units, each unit having flat top and bottom surfaces;

a plurality of cushioning gaskets; each of said cushioning gaskets sandwiched between two of said porous ceramic units; and a rigid compression means for maintaining said porous ceramic units and cushioning gaskets in sandwiched alignment and for rigidly connecting said porous ceramic units and gaskets to said vessel.

8. A device for separating a liquid into its parts, comprising:

a substantially cylindrical, enclosed, hollow vessel including a wall;

a stationary, porous medium in said vessel;

a port part-way up the vessel;

a bottom opening near the bottom of the vessel;

a top opening near the top of the vessel, said top opening being in fluid communication with said stationary porous medium, such that any liquid entering the vessel throught the part-way up port must pass through said porous medium in order to leave the vessel through said top opening; and a jacket around said vessel for receiving fluid to control the temperature inside said vessel;

said device alternately functioning as:

a) a continuous coalescer, wherein a liquid-liquid mixture entering through the part-way up port is separated by the porous medium, with the light liquid leaving through the top opening and the heavy liquid leaving through the bottom opening, and b) a continuous evaporator, wherein a liquid-liquid mixture is heated by the fluid in the jacket and separated into its parts by boiling off the more volatile component which passes through the porous medium and out the top opening; and further comprising an injection system on the same side of said porous medium as said part-way up port for injecting fluid near the top of said vessel at points along the wall of said vessel in a substantially horizontal direction tangential to the wall of said vessel, so as to form a thin film of fluid along the wall of said vessel for continuous thin film evaporation.

* * * * *